United States Patent
Alkemade et al.

(10) Patent No.: US 8,182,935 B2
(45) Date of Patent: May 22, 2012

(54) ELECTROCHEMICAL ENERGY STORE

(75) Inventors: Ulrich Alkemade, Leonberg (DE);
Frank Baumann, Mundelsheim (DE);
Florian Wahl, Lohr (DE); Bernd Schumann, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 743 days.

(21) Appl. No.: 12/290,037

(22) Filed: Oct. 23, 2008

(65) Prior Publication Data

US 2009/0123815 A1    May 14, 2009

(30) Foreign Application Priority Data

Oct. 24, 2007   (DE) .................. 10 2007 050 812

(51) Int. Cl.
*H01M 10/50*     (2006.01)

(52) U.S. Cl. ........................ 429/62; 429/120
(58) Field of Classification Search .............. 429/62, 429/120
See application file for complete search history.

(56) References Cited

U.S. PATENT DOCUMENTS

| 3,110,633 A | | 11/1963 | Bachmann |
| 4,883,726 A | * | 11/1989 | Peled et al. .................. 429/120 |
| 7,147,071 B2 | * | 12/2006 | Gering et al. ............. 429/120 X |
| 7,931,979 B2 | * | 4/2011 | Choi et al. .................... 429/120 |
| 2001/0033961 A1 | * | 10/2001 | Gudmundsson et al. ....... 429/62 |

FOREIGN PATENT DOCUMENTS

| DE | 10003740 | 6/2001 |
| DE | 10134145 | 2/2003 |
| DE | 102005031504 | 7/2005 |
| DE | 102005000060 | 11/2006 |
| DE | 10358582 | 7/2007 |
| EP | 1722192 | 11/2006 |

* cited by examiner

*Primary Examiner* — Stephen J. Kalafut
(74) *Attorney, Agent, or Firm* — Kenyon & Kenyon LLP

(57) ABSTRACT

An electrochemical energy store, including at least one electrochemical cell as well as at least one latent heat storage unit, which includes at least one phase change material. The at least one electrochemical cell is a lithium ion accumulator. The exemplary embodiments and/or exemplary methods of the present invention also includes the use of the electrochemical energy store in an electric vehicle or a hybrid vehicle. Furthermore, the exemplary embodiments and/or exemplary methods of the present invention relates to a method for temperature regulation of an electrochemical energy store.

21 Claims, 2 Drawing Sheets

ELECTROCHEMICAL ENERGY STORE

FIELD OF THE INVENTION

The present invention relates to an electrochemical energy store. The present invention also relates to the use of the electrochemical energy store, as well as a method for the temperature regulation of the electrochemical energy store.

BACKGROUND INFORMATION

The development of hybrid vehicles and electric vehicles requires the application of efficient electrochemical energy stores. A sufficient performance is provided, for example, by lithium ion accumulators. However, the optimum power yield of lithium ion accumulators is temperature dependent. In fact, the temperature range in which lithium ion accumulators are able to be operated effectively and with certainty is the range from −10° C. to 50° C. This temperature range, however, is not sufficient for operation in a motor vehicle. Thus, it is also particularly desirable that a motor vehicle is also able to be operated in wintertime, when temperatures fall below −10° C. Temperatures of more than 50° C. may also occur in motor vehicles due to insulation. In this case, too, however, a secure operation of the lithium ion accumulator has to be ensured.

It is discussed in U.S. Pat. No. 3,110,633 that one may accommodate a sulfur-lead accumulator in a housing that is filled with a phase change material. The phase change material functions as a latent heat accumulator. The phase change material is used to store heat from the operation of the vehicle over a longer period, in order to improve cold start operation in response to shorter standstill times, in the case of outside temperatures below the freezing point, when the storage capacity of the lead-sulfur accumulator is greatly reduced. Such a sulfur-lead accumulator, as is used as a vehicle battery, is, however, not sufficient with respect to its power yield, for example, in order to actuate a hybrid vehicle or an electric vehicle.

SUMMARY OF THE INVENTION

An electrochemical energy store developed according to the present invention includes at least one electrochemical cell as well as at least one latent heat storage unit that includes at least one phase change material. The at least one electrochemical cell is a lithium ion accumulator.

By the application of the lithium ion accumulator, a sufficiently high-performance accumulator is provided, by which hybrid vehicles or electric vehicles are also able to be operated. By using the latent heat storage unit that includes the phase change material, it is possible to operate the electrochemical energy store even at temperatures below −10° C. or at temperatures above 50° C. in an effective and secure manner.

Every material is designated as a phase change material, within the meaning of the exemplary embodiments and/or exemplary methods of the present invention, which changes phase at a constant temperature by heat absorption or heat emission. The transition between the two phases often takes place abruptly. During heat storage, the phase change material is generally converted from one phase to another by the addition of heat, usually from a solid or crystalline phase into a liquid or dissolved phase. If the phase change material is then not further acted upon, it stays in its last-named phase, even when it cools off. In the changed phase of the material, the heat energy is stored in a latent manner, that is, in a hidden manner. The release of the stored heat energy is brought about by specifically causing a slight electrical, mechanical or chemical change in the phase change material.

Paraffins or salt hydrates, for instance, are phase change materials that are suitable according to the exemplary embodiments and/or exemplary methods of the present invention. As paraffins, for example, those having a melting point of 40° C. are suitable, and as salt hydrates, for example, $Na_2S_2O_5.5H_2O$, $Mg(NO_3)_2.6H_2O/MgCl_2.6H_2O$, $NaOC_2H_5.3H_2O$.

By using a suitable phase change material, it is possible to operate the energy store even at environmental temperatures at which an effective and certain operation of the electrochemical energy store is usually not possible. Thus, it is possible, on the one hand, to compensate for an environmental temperature that is above the admissible operating temperature by applying a phase change material which, at a temperature that is equal to the maximum admissible temperature for the operation of the electrochemical energy store, or below, absorbs heat. This results in cooling the electrochemical energy store.

On the other hand, if the environmental temperature is lower than the required minimum temperature in order to ensure an effective operation of the electrochemical energy store, it is also possible to use a phase change material which changes phase at a temperature above the required minimum temperature by giving off heat, and thus heats up the electrochemical energy store. For a secure operation of the electrochemical energy store in a wide temperature range, in which temperatures may occur which are both below the required minimum temperature for effective operation and above the admissible highest temperature for a secure operation of the electrochemical energy store, a phase change material which changes phase by heat storage or heat emission at a temperature that is in the optimal operating range of the electrochemical energy store may be used. A phase change material may be used which changes its phase at a temperature that is in the range of 35 to 65° C., and which may be in the range of 35 to 50° C.

The application of the phase change material further has the advantage that, during the running operation of the electrochemical energy store, temperature peaks that occur are able to be damped by targeted heat absorption or heat emission of the phase change material. In particular, temperature peaks are able to be capped by using the phase change material, so that the electrochemical energy store is protected from overheating and undercooling.

When the electrochemical energy store is used in a hybrid vehicle or an electric vehicle, greater temperature fluctuations take place, for example, during the change from daytime to nighttime temperatures. When the vehicle is used in desert areas, in particular, large temperature differences occur between daytime temperatures and nighttime temperatures. Furthermore, large temperature fluctuations also occur when the vehicle is shut off after longer operation at very low outside temperatures, such as occur in wintertime. Such temperature fluctuations are able to be compensated for by the specific selection of the phase change material. In the range of the operating temperature, a phase change of the phase change material takes place by heat absorption. The phase change material usually changes its phase, for instance, from solid to liquid, from liquid to gaseous or from solid to gaseous. When the phase change material is cooled, it maintains its phase, and the stored heat energy is emitted only slowly.

The maximum energy quantity that is to be absorbed from the environment or from the electrochemical energy store is able to be established by the quantity of the phase change material used.

The quantity of the phase change material may be figured to the effect that the heat quantity that is transferred into the phase change material during the day, and the additional heat quantity derived from the operation of the electrochemical energy store are able to be absorbed, and a reserve is left over in addition.

A specific heat absorption or heat emission of the phase change material may advantageously be achieved by having the phase change material connected to a tempering device.

In one specific embodiment, the tempering device includes a heat exchanger by which heat may be absorbed from the environment or from which heat may be emitted to the environment. Any heat exchanger known to one skilled in the art is suitable, in this context. An improved heat emission from the heat exchanger to the environment is achieved in that the environmental air is conducted through the heat exchanger with the aid of a blower, and thus a convective heat transition takes place from the surface of the heat exchanger to the environmental air.

A tempering medium that is able to exchange heat with the phase change material is tempered in the heat exchanger. For this purpose, tubes are accommodated in the phase change material which have tempering medium flowing through them. In this way, it is possible to deliver heat to the phase change material in a purposeful manner or dissipate heat from the phase change material.

In order to control the tempering of the electrochemical energy store, the electrochemical energy store may also include a control unit. A computing unit having a data memory is suitable, for instance, as a control unit. It is able to set up a day/night temperature model as a function of a calendar, and adjust this to the operating location of the vehicle, for instance, as a function of the operating location of the vehicle, if the electrochemical energy store is used in a hybrid vehicle or an electric vehicle. The operating location of the vehicle may be ascertained, for example, using a GPS receiver, of the type generally included in navigational systems that are sold in the trade.

In order to be able to dissipate heat from the individual electrochemical cells of the electrochemical energy store or to supply heat to the individual electrochemical cells, in one specific embodiment, the at least one electrochemical cell is enclosed by a heat conducting material. The latent heat storage unit surrounds the heat conducting material. In this way, heat is transported through the heat conducting material from the electrochemical cell to the latent heat storage unit. A paste made of $Al_2O_3$ or MgO, also in connection with Al or Cu powder, is suitable as heat conducting material, so that the insulating capability remains intact.

To compensate for temperature fluctuations, at times of standstill, the temperature may be lowered to a greater extent than the optimum required in the operation, in order better to absorb the heat, given off by cooling to the phase change material, in response to a renewed start-up of the electrochemical energy store or in response to driving off the vehicle in electrical operation, if the electrochemical energy store is used in a hybrid vehicle.

Furthermore, it is also possible to set the temperature of the electrochemical energy store higher by the tempering device and the heat exchanger at very low environmental temperatures, to prevent further cooling and thereby enable putting into operation of the electrochemical energy store at a higher operating temperature.

Moreover, it is also possible, at regularly low outside temperatures, to keep the temperature of the electrochemical energy store above the setpoint level, in order, in the case of fluctuations in the environmental temperature, especially in the case of further cooling, to reserve a safety range so as to make possible a secure operation of the electrochemical energy store. Correspondingly, at outside temperatures which are generally above the optimum operating temperature of the electrochemical energy store, it is also possible to set the setpoint temperature by the phase change material to a temperature that is below the optimum temperature, so as to be able better to compensate for a higher environmental temperature in this case too.

A further advantage of using the latent heat storage unit is that the cold start capability of the electrochemical energy store may be improved. For this purpose, a phase change material is advantageously used, which is liquid in the range of the operating temperature of the electrochemical energy store. Upon cooling, the phase change material maintains its phase. For the cold start, a phase change in the phase change material is initiated in a targeted manner. The initiation of the phase change takes place, for instance, by electrical, chemical or mechanical activation. In the process, the latent heat, for instance, of crystallization of the phase change material is specifically liberated. In this way, the required operating temperature of the electrochemical energy store is able to be reached more quickly. To increase the temperature of the electrochemical energy store to the operating temperature, it is possible for the phase change material to be contained in one volume. Alternatively, however, it is also possible for the phase change material to be subdivided into several volumes having a separate or common tempering devices, so that the heat quantity, required in each case for the cold start, is procured from only one part of the phase change material. By doing this, a system of higher dynamics is created. The subdivision into different volumes takes place, for example, by having the latent heat storage unit enclosed by a second latent heat storage unit, which also contains phase change material. The phase change materials in the two latent heat storage units may be the same or different, in this context.

Alternatively, it is also possible that the at least one electrochemical cell is enclosed by a heat conducting material, and in the heat conducting material at least two latent heat storage units are accommodated. The individual latent heat storage units may be activated either in common or each individually, separately by itself, in this instance, so that it is possible that the heat of all latent heat storage units is given off in common or that only individual latent heat storage units give off heat. Because of the embedding of the latent heat storage units in the heat conducting material, heat is also given off by a single latent heat storage unit to all electrochemical cells that are enclosed by the heat storing material.

In a further alternative specific embodiment, the electrochemical energy store includes at least two electrochemical cells and each of the electrochemical cells is enclosed by a latent heat storage unit. In one specific embodiment, the electrochemical cells enclosed by the latent heat storage unit are surrounded by a heat conducting material. The tempering device is accommodated in the heat conducting material, and using the former, a targeted heat supply to, or heat dissipation from the phase change material is able to take place.

A further advantage of using a latent heat storage unit that includes a phase change material is that the security of the electrochemical energy store is increased. For this purpose, it is required that a phase change of the phase change material from solid to liquid, from liquid to gaseous or from solid to gaseous take place below the critical temperature range of the electrochemical energy store. Thermal energy is absorbed and stored by the phase change material because of the phase change. Because of this, one may slow down or even entirely prevent the further heating of the electrochemical energy store. Just as in the case of the improvement of the cold start properties, in a first specific embodiment the entire quantity of the phase change material is present in a single latent heat storage unit, which surrounds the electrochemical energy store. However, a plurality of volumes may be provided which include a phase change material. To do this, it is possible on the one hand, as was described above, that the latent heat storage unit be enclosed by a second latent heat storage unit. Moreover, it is also possible that, in the heat conducting material that surrounds the at least one electrochemical cell, at least two latent heat storage units are accommodated. If at least two latent heat storage units are provided, a system having higher dynamics may be set.

Furthermore, the exemplary embodiments and/or exemplary methods of the present invention relates to a method for temperature regulation of the electrochemical energy store. The method includes the following steps:

Measuring the temperature in the electrochemical cells of the electrochemical energy store, activating the phase change material to go through the phase change, and because of the phase change, heat being absorbed by the phase change material if a specified maximum temperature is reached or exceeded in the electrochemical energy store, or, because of the phase change, heat being given off by the phase change material if a specified minimum temperature is reached or undershot in the electrochemical energy store.

Thus, using the activation of the phase change material and the phase change, the temperature of the electrochemical energy store may be regulated in a targeted manner.

Exemplary embodiments of the present invention are depicted in the drawings and described in greater detail in the description below.

DETAILED DESCRIPTION

Figure 1:
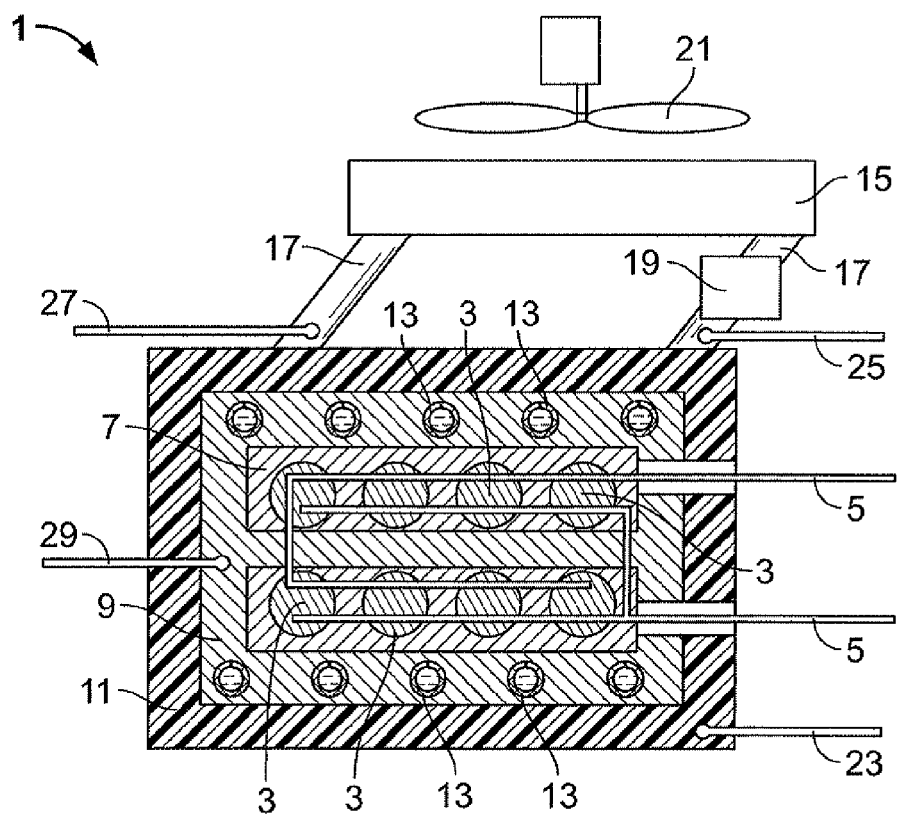
FIG. 1 shows an electrochemical energy store in a first specific embodiment.

An electrochemical energy store 1 includes a plurality of electrochemical cells 3. The electrochemical cells are lithium ion accumulators, according to the exemplary embodiments and/or exemplary methods of the present invention. The individual electrochemical cells 3 each have an electric positive pole and an electric negative pole. The individual positive poles and the individual negative poles of electrochemical cells 3 are connected to one another via a current diverter 5. An electric consumer may be connected to current diverter 5.

Electrochemical cells 3 are enclosed by a heat conducting material 7. In turn, heat conducting material 7 is surrounded by a latent heat storage unit 9. Latent heat storage unit 9 includes a phase change material. Heat may be conducted from latent heat storage unit 9 to electrochemical cells 3 by heat conducting material 7. In the same way, electrochemical cells 3 are able to give off heat to latent heat storage unit 9 through heat conducting material 7. A paste made of $Al_2O_3$ or MgO, also in connection with Al or Cu powder, is used as heat conducting material, so that the insulating capability remains intact.

The phase changing material contained in the latent heat storage unit may have a plateau temperature in the range of 35 to 65° C., and a range may be 35 to 50° C.

The plateau temperature, in this instance, is the temperature at which the phase change of the phase change material takes place due to heat absorption or heat dissipation.

In order for latent heat storage unit 9 not to give off heat to the environment, but rather to electrochemical cells 3, or to absorb heat from electrochemical cells 3 and not from the environment, latent heat storage unit 9 is enclosed by an insulation 11. Any heat-insulating material desired is suitable for insulation 11. Materials for insulation 11 may be plastic or ceramic foam materials or fiber materials.

In order to be able to supply heat to, or dissipate heat from the phase change material in latent heat storage unit 9 in a targeted way, a tempering device 13 may be accommodated in latent heat storage unit 9. Tubes having tempering agent flowing through them are suitable, for example, as tempering device 13. In order to be able to supply heat to, or dissipate heat from the tempering agent, tempering device 13 is connected to a heat exchanger 15. When tubes having tempering agent flowing through them are used as tempering device 13, the connection of tempering device 13 to heat exchanger 15 takes place via tempering agent lines 17. The transport of the tempering agent through tempering agent lines 17 and tempering device 13 is performed using a pump 19, which is accommodated in tempering agent line 17.

In general, heat exchanger 15 is used as a cooler, in order to cool the tempering agent which flows through tempering device 13 and tempering agent line 17. The cooling takes place by heat being given off by the tempering medium to the environment. To do this, the tempering agent may be compressed before running into heat exchanger 15. The compression takes place using pump 19, for example. An improved heat dissipation is achieved by having environmental air flowing through heat exchanger 15. This enables a convective heat transition. For the purpose of having flow through heat exchanger 15, a blower 21 is provided. Environmental air is blown through heat exchanger 15 using blower 21. The environmental air flows around heat exchange surfaces in heat exchanger 15. The heat exchange surfaces are the walls of tubes that have tempering media flowing through them, for example. In order to enlarge the heat exchanging surface, fins may be mounted on the tubes. However, besides tubes having a flow through them, any other type of heat exchanger may also be used. As heat exchanger, one may use, for instance, plate heat exchangers, spiral heat exchangers, tube bundle heat exchangers and any other desired form of heat exchanger known to one skilled in the art. Heat exchanger 15 has only to be suitable for giving off heat to the environmental air.

In order to dissipate temperature fluctuations, of the kind that occur in response to temperature differences between daytime temperatures and nighttime temperatures, or in response to a higher operating temperature and a very low environmental temperature, the phase change material of latent heat storage unit 9 absorbs heat from electrochemical energy store 1. In this connection, a phase change in the phase change material in latent heat storage unit 9 takes place from solid to liquid, from liquid to gaseous or from solid to gaseous. Now, if the operation of the electrochemical energy store is ended, and the electrochemical energy store cools off or takes on the outside temperature, the phase change material in latent heat storage unit 9 also cools off. Upon cooling, the phase change material maintains its phase. The heat stored by the phase change material is given off only slowly. It is thereby possible to maintain the temperature of the electrochemical cells 3 of electrochemical energy store 1.

In order to improve the cold start capability of the electrochemical energy store, during the operation, heat is also given off to the phase change material of latent heat storage unit 9, whereby the material changes phase. For the cold start, a phase change of the phase change material in latent heat storage unit 9 is initiated from liquid to solid, from gaseous to solid or from gaseous to liquid. In response to this phase change, heat is liberated. This heat is conducted to electrochemical cells 3, and it heats them up to the operating temperature.

In a corresponding manner, the phase change material is also used to increase the security of electrochemical energy store 1, especially when high temperatures occur, which may lead to fire manifestations or explosions, heat being dissipated from electrochemical cells 3 by the phase change, and the cells may thus be cooled to the operating temperature. A phase change takes place from solid to liquid, from liquid to gaseous or from solid to gaseous. During this phase change, the phase change material absorbs heat at constant temperature.

In order to be able to control the temperature response, temperature sensors 23, 25, 27, 29 are provided. The temperature in insulation 11 is measured using a first temperature sensor 23. A second temperature sensor 25 measures the temperature of the temperature medium during its inflow to heat exchanger 15. A third temperature sensor 27 measures the temperature of the tempering medium during its outflow from heat exchanger 15. Finally, a fourth temperature sensor 29 measures the temperature of the phase change material in latent heat storage unit 9. Using second and third temperature sensors 25, 27, it may be ascertained whether it is necessary to cool the tempering medium that flows through tempering device 13, in order, for instance, to initiate a phase change of the phase change material in latent heat storage unit 9, in a targeted manner. It is also necessary to measure the temperature of the phase change material, for control purposes. This is done using fourth temperature sensor 29.

Figure 2:
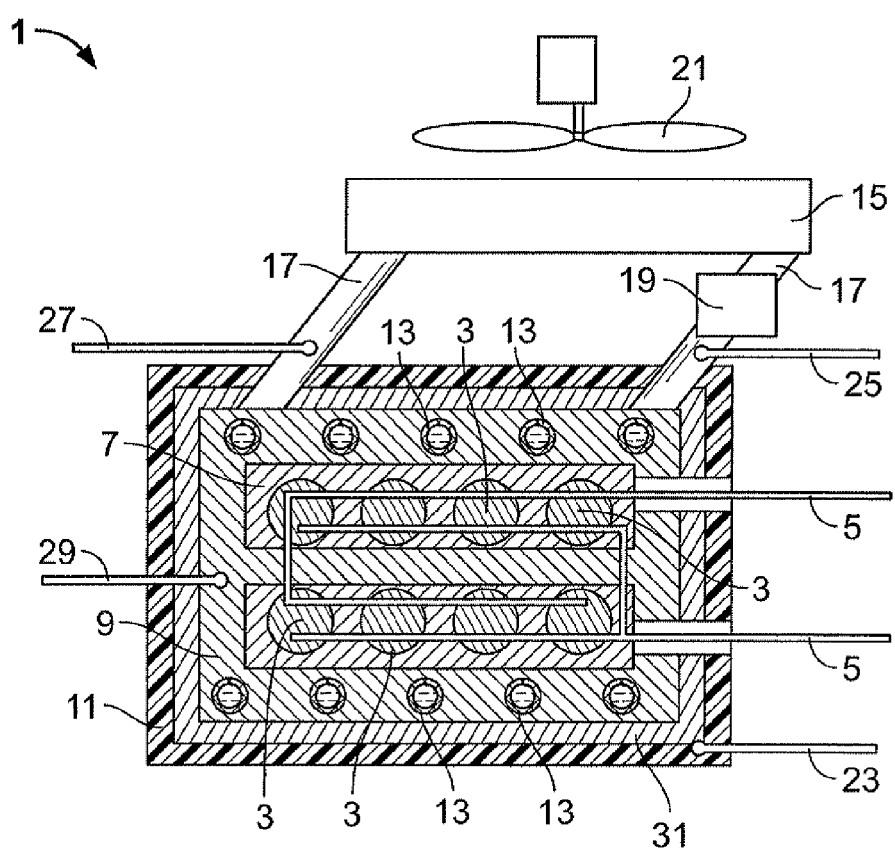
FIG. 2 shows an electrochemical energy store in a second specific embodiment.

FIG. 2 shows an electrochemical energy store in a second specific embodiment. The electrochemical energy store shown in FIG. 2 differs from the one shown in FIG. 1 in that latent heat storage unit 9 is enclosed by a second latent heat storage unit 31. Second latent heat storage unit 31 likewise contains a phase change material. Because of second latent heat storage unit 31, the volume of the phase change material is increased. This makes available a greater heat storage capacity. In addition, second latent heat storage unit 31 also permits a more dynamic response. Thus it is possible, for example, that heat is first given off by latent heat storage unit 9 to electrochemical cells 3, and if this is not sufficient, by second latent heat storage unit 31. If a large quantity of heat has to be provided immediately, it is also possible, for instance, to activate both latent heat storage units 9, 31, so that the entire stored heat quantity is made available by the two latent heat storage units 9, 31. This is required, for instance, if the electrochemical energy store is to be rapidly put into operation at very low outside temperatures.

Figure 3:
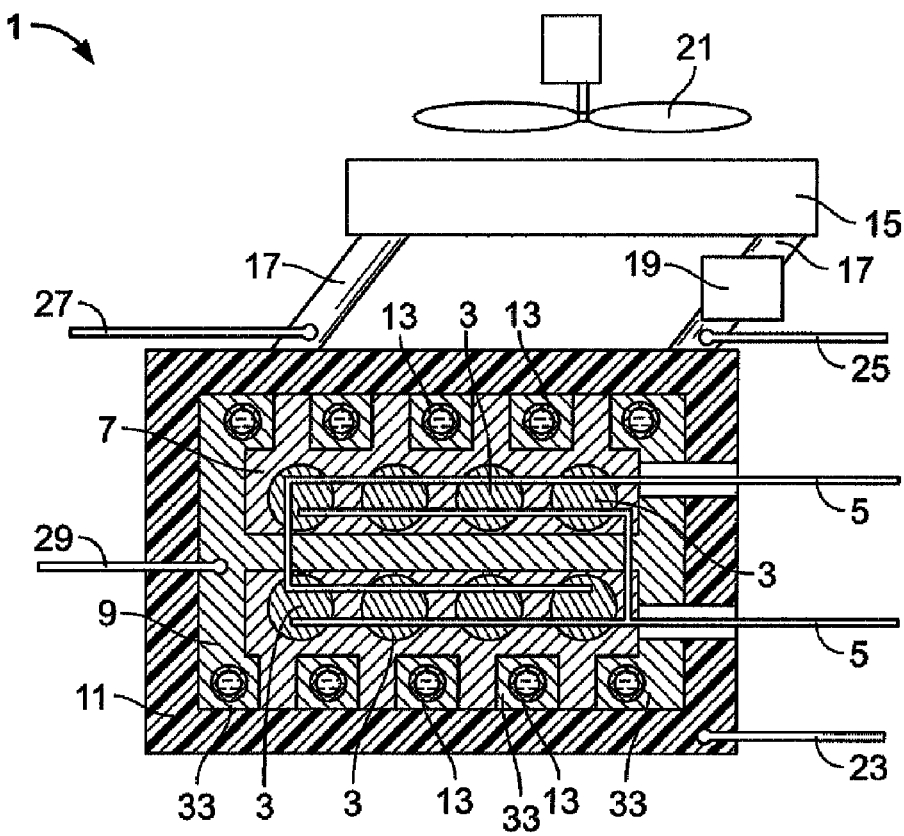
FIG. 3 shows an electrochemical energy store in a third specific embodiment.

The specific embodiment of electrochemical energy store 1 shown in FIG. 3 permits even greater dynamics. By contrast to the specific embodiment shown in FIG. 1, in the specific embodiment shown in FIG. 3, a plurality of latent heat storage units 33 is accommodated in heat conducting material 7. Because of a targeted activation of the individual latent heat storage units 33, heat may be absorbed or given off respectively by each individual latent heat storage unit 33. This makes it possible respectively to liberate or absorb a small quantity of heat over a long period, or it is also possible to activate a plurality of latent heat storage units 33 simultaneously, in order to absorb or liberate a large quantity of heat. For purposes of control, just as in the specific embodiments shown in FIGS. 1 and 2, the four temperature sensors 23, 25, 27, 29 are provided.

Figure 4:
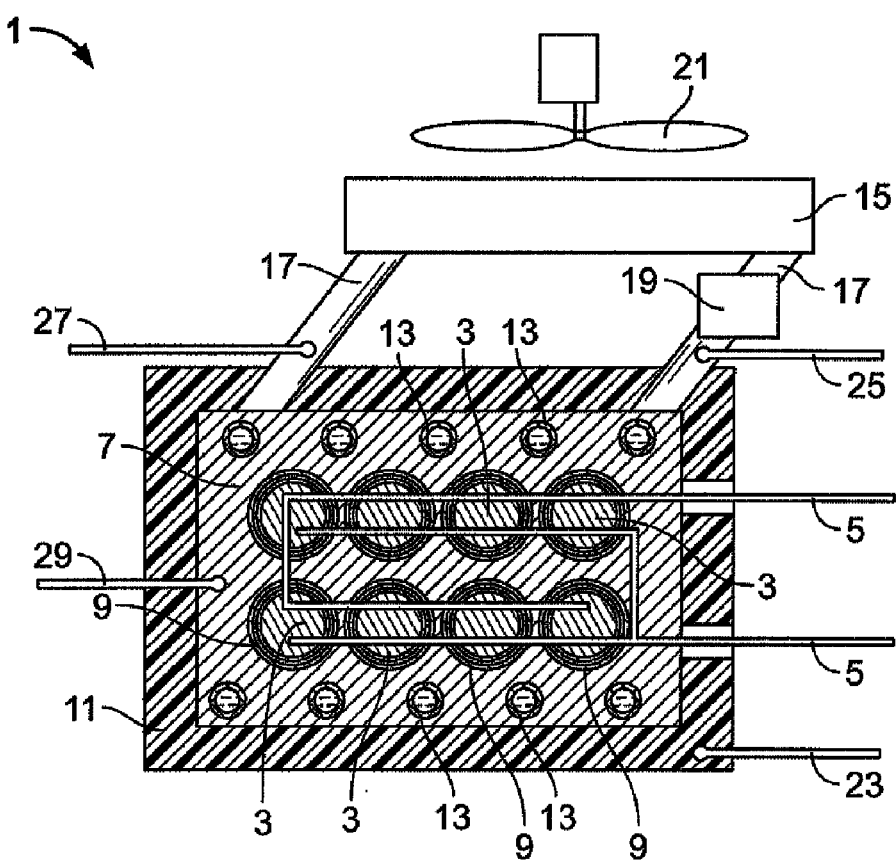
FIG. 4 shows an electrochemical energy store in a fourth specific embodiment.

FIG. 4 shows a fourth specific embodiment of an electrochemical energy store.

In the specific embodiment shown in FIG. 4, each individual electrochemical cell 3 is enclosed by a latent heat storage unit 9. Furthermore, latent heat storage units 9 are surrounded by heat conducting material 7. Tempering device 13, by the use of which a targeted heating or cooling of latent heat storage unit 9 is able to take place, is placed outside latent heat storage unit 9 in heat conducting material 7. The heat is transferred from tempering device 13 to latent heat storage unit 9 by heat conducting material 7, or heat is absorbed by the latent heat storage units.

Temperature sensors 25, 27 used for regulating the tempering are accommodated in the inflow to, and the outflow from heat exchanger 15, first temperature sensor 23 measures the temperature in insulation 11, and fourth temperature sensor 29 measures the temperature in heat conducting material 7. Since heat is given off by all electrochemical cells 3 to heat conducting material 7, a temperature measurement in heat conducting material 7 is sufficient to establish whether electrochemical cells 3 have reached their operating temperature or have assumed a temperature above the secure operating temperature.

What is claimed is:

1. An electrochemical energy store comprising:
    at least one electrochemical cell;
    at least one latent heat storage unit, which includes at least one phase change material; and
    at least one tempering device, which is accommodated in the latent heat storage unit;
    wherein the at least one electrochemical cell is a lithium ion accumulator.

2. The electrochemical energy store of claim 1, wherein the phase change material is a paraffin or a salt hydrate.

3. The electrochemical energy store of claim 1, further comprising:
    a heat exchanger, by which heat is able to be at least one of absorbed and given off from the environment.

4. The electrochemical energy store of claim 1, further comprising:
    a control unit by which a tempering is able to be controlled.

5. The electrochemical energy store of claim 1, wherein the at least one electrochemical cell is enclosed by a heat conducting material, and wherein the latent heat storage unit surrounds the heat conducting material.

6. The electrochemical energy store of claim 1, wherein the electrochemical energy store includes at least two electrochemical cells and each of the electrochemical cells is enclosed by a latent heat storage unit.

7. The electrochemical energy store of claim 6, wherein the electrochemical cells enclosed by the latent heat storage unit are surrounded by a heat conducting material.

8. The electrochemical energy store of claim 7, wherein a tempering device is accommodated in the heat conducting material.

9. The electrochemical energy store of claim 1, wherein the at least one electrochemical cell is enclosed by a heat conducting material, and in the heat conducting material at least two latent heat storage units are accommodated.

10. An electrochemical energy store, comprising:
    at least one electrochemical cell; and
    at least one latent heat storage unit, which includes at least one phase change material;

wherein the at least one electrochemical cell is a lithium ion accumulator, wherein the electrochemical energy store includes at least two electrochemical cells and each of the electrochemical cells is enclosed by a latent heat storage unit, wherein the electrochemical cells enclosed by the latent heat storage unit are surrounded by a heat conducting material, wherein a tempering device is accommodated in the heat conducting material, and wherein the latent heat storage unit is enclosed by a second latent heat storage unit.

11. The electrochemical energy store of claim 10, wherein the phase change material is one of a paraffin and a salt hydrate.

12. The electrochemical energy store of claim 10, further comprising:

a heat exchanger, by which heat is able to be at least one of absorbed and given off from the environment.

13. The electrochemical energy store of claim 10, further comprising:

a control unit by which a tempering of the electrochemical energy store is able to be controlled.

14. An electrochemical energy store comprising:

at least one electrochemical cell enclosed by a heat conducting material;

at least two latent heat storage units accommodated in the heat conducting material, which includes at least one phase change material; and at least one tempering device accommodated in each of the latent heat storage units;

wherein the at least one electrochemical cell is a lithium ion accumulator.

15. An electrochemical energy store comprising:

at least one electrochemical cell; and at least one latent heat storage unit, which includes at least one phase change material;

wherein the at least one electrochemical cell is a lithium ion accumulator, wherein a tempering device is accommodated in the latent heat storage unit, and wherein the tempering device includes at least one pipe having a tempering medium flowing through it.

16. An electrochemical energy store for use in an electric vehicle or in an hybrid vehicle so as to provide the electric energy for the driving operation, comprising:

at least one electrochemical cell;

at least one latent heat storage unit, which includes at least one phase change material; and at least one tempering device accommodated in the latent heat storage unit;

wherein the at least one electrochemical cell is a lithium ion accumulator.

17. The electrochemical energy store of claim 16, wherein the phase change material is one of a paraffin and a salt hydrate.

18. The electrochemical energy store of claim 16, further comprising:

a heat exchanger, by which heat is able to be at least one of absorbed and given off from the environment.

19. The electrochemical energy store of claim 16, further comprising:

a control unit by which a tempering of the electrochemical energy store is able to be controlled.

20. The electrochemical energy store of claim 16, wherein the at least one electrochemical cell is enclosed by a heat conducting material, and wherein the latent heat storage unit surrounds the heat conducting material.

21. A method for temperature regulation of an electrochemical energy store, the method comprising:

measuring a temperature in electrochemical cells of the electrochemical energy store; and activating at least one phase change material to go through the phase change, and because of the phase change, heat being absorbed by the phase change material if a specified maximum temperature is reached or exceeded in the electrochemical energy store, or, because of the phase change, heat being given off by the at least one phase change material if a specified minimum temperature is reached or undershot in the electrochemical energy store;

wherein the electrochemical energy store includes the electrochemical cells, at least one latent heat storage unit, which includes at least one phase change material, at least one tempering device accommodated in the latent heat storage unit, and wherein the electrochemical cells include a lithium ion accumulator.

* * * * *